May 14, 1968  A. RIEDEL ET AL  3,383,069

REEL FOR ROLL FILM

Filed March 13, 1967

INVENTORS
ANTON RIEDEL
CLEMENZ BECK

BY  Michael J. Striker ns Patent Office 3,383,069
Patented May 14, 1968

3,383,069
REEL FOR ROLL FILM
Anton Riedel, Gauting, and Clemenz Beck, Munich, Germany, assignors to Agfa-Gevaert Aktiengesellschaft, Leverkusen, Germany
Filed Mar. 13, 1967, Ser. No. 622,740
Claims priority, application Germany, Sept. 16, 1966, A 53,513
10 Claims. (Cl. 242—74)

ABSTRACT OF THE DISCLOSURE

A reel for roll film comprising a cylindrical core having a longitudinally extending substantially diametrical open-ended slot. The slot is bounded by two side surfaces and two end surfaces. Two guide members extend inwardly toward each other from the respective end surfaces, and two retaining member extend inwardly toward each other from the respective side surfaces and respectively serve to hold against retraction the leading end of a strip which has been introduced through a respective end of the slot.

---

Figure 2:
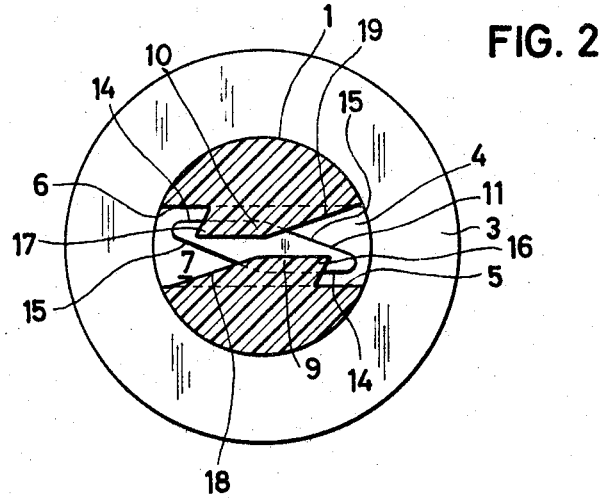

The present invention relates to improvements in reels or spools for roll film or the like, particularly to improvements in miniature reels for use in still cameras in connection with 35-mm. film.

It is already known to provide a reel with two slots each of which can receive the leading end of a photographic film. One of the slots is arranged to receive the leading end from the one side and the other slot is intended to receive the film from the other side of the reel. Each slot accommodates a barb or tooth which prevents retraction of the leading end. A serious drawback of such reels is that their manufacturing cost is too high, mainly because they cannot be formed in a simple die or mold. This is attributable to the provision of two separate slots. Also, such reels cannot be used in dark rooms because, without seeing the reel, the operator does not know which of the two slots is to receive the leading end of a film from a given side of the reel.

Accordingly, it is an important object of our present invention to provide a novel and improved reel for photographic roll film or like strip- or band-shaped flexible material and to construct and assemble the reel in such a way that the leading end of a strip can be properly threaded through and retained in the core irrespective of the direction in which the leading end is being fed by the operator's hand so that the operator need not actually see the reel during threading.

Another object of the invention is to provide a simple, lightweight, inexpensive and versatile reel for roll film or like strip stock and to design the reel in such a way that it can be mass-produced by resorting to simple machinery.

A further object of the instant invention is to provide a reel whose core is formed with a single slot but is capable, nevertheless, of retaining the leading end of a strip irrespective of the direction in which the leading end is being introduced into the single slot.

A concomitant object of the invention is to provide the above outlined reel with a novel core and with novel strip-guiding and strip-retaining members which can be formed as integral parts of the core.

Briefly outlined, one feature of our present invention resides in the provision of a reel for elongated flexible strip stock, particularly for photographic roll film. In its presently preferred form, the reel comprises an elongated core having a slot and two retaining members having pointed portions one of which can hold against retraction the leading end of a strip which has been introduced through one end of the slot and the other of which can retain against retraction a strip whose leading end has been introduced from the other end of the slot.

The core preferably consists of synthetic plastic material and is made integral with the partitions and retaining members.

Figure 1:
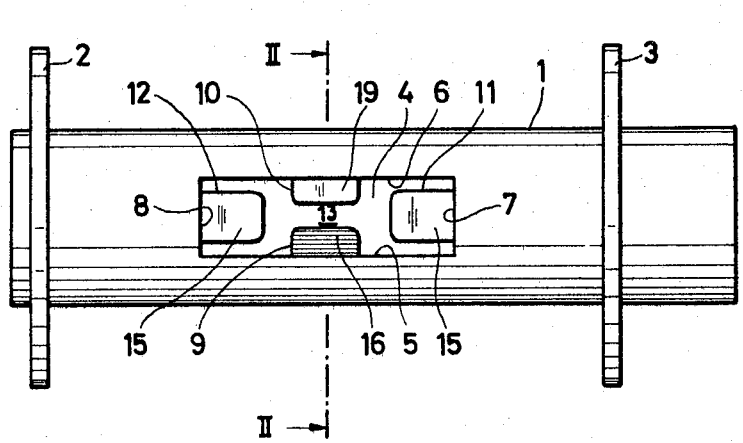

The novel features which are considered as characteristic of the invention are set forth in particular in the appended claims. The improved reel itself, however, both as to its construction and its mode of operation, together with additional features and advantages thereof, will be best understood upon perusal of the following detailed description of a specific embodiment with reference to the accompanying drawings, in which:

FIG. 1 is a side elevational view of a reel which embodies the present invention; and FIG. 2 is a transverse section as seen in the direction of arrows from the line II—II of FIG. 1.

Referring to the drawings in detail, there is shown a reel or spool for 35-mm. roll film or the like. This reel comprises an elongated cylindrical core 1 with two axially spaced flanges 2, 3. The core 1 is provided with a diametrical through slot 4 having two open ends disposed at the opposite sides of the core axis and bounded by two side surfaces 5, 6 and two end surfaces 7, 8. The side surfaces 5, 6 are parallel to each other and to the axis of the core 1. The end surfaces 7, 8 extend transversely of the core.

The reel further comprises two retaining members 9, 10 and two partitions 11, 12. These partitions respectively extend inwardly from the end surfaces 7, 8 and are aligned with but spaced from each other, as considered in the axial direction of the core 1. The width of the gap 13 between the partitions 11, 12 at least equals but may exceed half the width of the leading end of the film or other strip material which is being used in connection with our reel. Each of the two partitions 11, 12 is bounded by two faces 14 which are parallel to and two inclined film-deflecting faces 15 which make acute angles with the side surfaces 5, 6. As clearly shown in FIG. 2, the cross-section of each partition resembles a parallelogram, in the present instance a rhomboid.

The retaining members 9, 10 resemble hooks or teeth and respectively comprise preferably pointed strip-retaining portions or ridges 16, 17 which face and taper toward the two open ends of the slot 4. The flanks 18, 19 of the retaining members 9, 10 make acute angles with the side surfaces 5, 6 but their inclination is opposite to that of the faces 15 on the partitions 11, 12. In this way, the flank 18 defines with one face 15 of each partition an inlet which tapers inwardly from the left-hand open end of the slot 4, as viewed in FIG. 2, and the flank 19 defines with the remaining two faces 15 a second inlet which tapers inwardly from the right-hand open end of the slot.

If the leading end of a strip is introduced in a direction from the left, as viewed in FIG. 2, the left-hand inclined faces 15 of the partitions 11, 12 will guide such leading end toward the flank 18 of the lower retaining member 9 so that the leading end will bypass the ridge 17 of the upper retaining member 10 and can be moved through the right-hand end of the slot 4. Retraction of the strip will be prevented by the lower ridge 16. Since the ridge 16 extends into the space between the partitions 11, 12, the latter will flex the marginal portions of the leading end downwardly and will thereby enhance the retaining action of this ridge.

The same leading end can be introduced from the right-hand open end of the slot 4 and is then deflected by the right-hand inclined faces 15 so that it bypasses the lower ridge 16 and is ultimately engaged by the upper ridge 17. Thus, the leading end of the strip can be introduced from either end of the slot 4 and, once the operator has been able to maneuver the leading edge of the strip into one of the aforementioned inwardly tapering inlets, the strip is merely pushed forwards and threads its way through the slot to be properly retained by the ridge 16 or 17, depending upon the direction of threading.

The partitions 11, 12 can be said to constitute two sections of a centrally located interrupted web or bridge which extends lengthwise of the slot 4. These partitions contribute to rigidity of the core 1 which latter is often subjected to very high stresses when the strip, held by the one or the other of two ridges 16, 17, is subjected to a strong pulling action. At this time, we prefer to make the entire reel out of a single piece of suitable synthetic plastic material, preferably by die casting. However, other manufacturing methods are not excluded. The molds for the reel are very simple because the core 1 is made integral with the retaining members 9, 10 and partitions 11, 12. The flanges 2, 3 can be made rigid with the core 1.

If the reel is used for storage of film or other strip material which is invariably introduced from the same side while the core is held in a predetermined angular position, one of the retaining members 9, 10 may be dispensed with and the inclination of one of the faces 15 is then of no importance insofar as proper guidance of strip material is concerned. However, the use of two retaining members is preferred because the operator can readily and rapidly thread the strip material from either end of the slot 4, and such threading can be carried out in a dark room. Also, it is then immaterial whether or not the core 1 is held in a predetermined angular position because the user knows that the leading end will be properly retained irrespective of the direction in which the strip material is being introduced into the slot 4.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A reel for photographic roll film or similar strips of flexible material, comprising a core having a substantially diametrical open-ended slot extending in the longitudinal direction of said core and bounded by two side surfaces and two end surfaces which respectively extend substantially longitudinally and substantially transversely of the core; two partitions each extending inwardly from one of said end surfaces and spaced from the other partition; and at least one retaining member spaced from said end surfaces and extending inwardly from one of said side surfaces, said retaining member having a strip-retaining portion facing one end of said slot so that said strip-retaining portion can hold against retraction the leading end of a strip which has been introduced through the other end of said slot.

2. A reel as defined in claim 1, further comprising a second retaining member spaced from said end surfaces and extending inwardly from the other side surface, said second retaining member having a strip-retaining portion facing the other end of said slot so that said last mentioned strip-retaining portion can hold against retraction the leading end of a strip which has been introduced through the one end of said slot.

3. A reel as defined in claim 2 for strips having loading ends of a predetermined width, wherein the spacing between said partitions at least equals half of said predetermined width.

4. A reel as defined in claim 2, wherein each of said partitions has two faces making acute angles with said side surfaces and each of said retaining members has a flank making an acute angle with one of said side surfaces, each of said flanks defining with one face of each retaining member an inlet for the leading end of the strip and such inlets tapering inwardly from the respective ends of said slot.

5. A reel as defined in claim 2, wherein said partitions and said retaining members form integral parts of said core.

6. A reel as defined in claim 5, wherein said core, said partitions and said retaining members consist of synthetic plastic material.

7. A reel as defined in claim 2, wherein said side surfaces are parallel to each other and to the axis of said core.

8. A reel as defined in claim 2, wherein the cross sections of said partitions resemble parallelograms.

9. A reel as defined in claim 8, wherein said retaining members are spaced from said partitions, as seen in the axial direction of said core.

10. A reel as defined in claim 2, wherein said core is of circular cross section and each of said retaining members resembles a tooth.

References Cited
UNITED STATES PATENTS 1,930,144   10/1933   Lee _____ 242—74

FOREIGN PATENTS 834,693   5/1960   Great Britain.
1,190,785   4/1965   Germany.

FRANK J. COHEN, *Primary Examiner.*

N. L. MINTZ, *Assistant Examiner.*